United States Patent Office 3,484,142
Patented Dec. 16, 1969

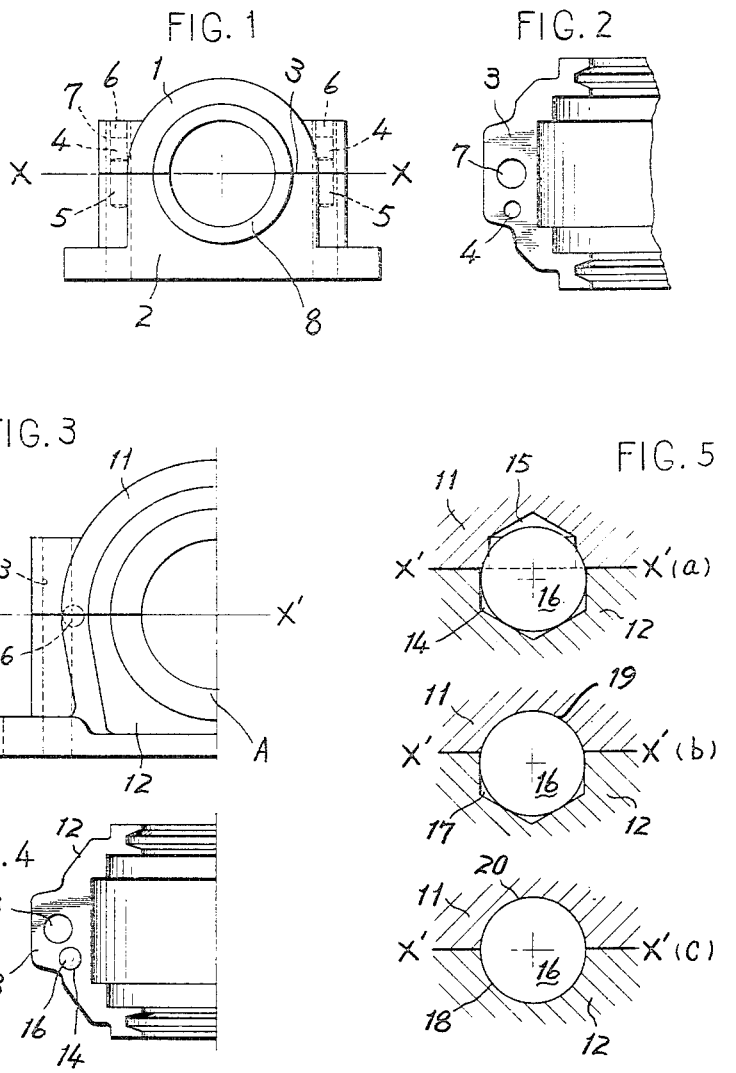

3,484,142
PLUMMER BLOCKS AND MANUFACTURE
METHODS THEREOF
Noboru Nishiwaki, Kaizu-gun, Gifu-ken, Japan, assignor to the United States of America as represented by the Secretary of the Air Force
Filed Jan. 3, 1968, Ser. No. 695,389
Int. Cl. F16c 35/00; F16b 7/00, 13/00
U.S. Cl. 308—24                                    3 Claims

ABSTRACT OF THE DISCLOSURE

Aligning means for the upper and lower members of a plummer block, which means comprises the provision of mated cavities in the joint faces of the upper and lower members and insertion of a ball in each mated cavity, the ball being harder than the material of the upper and lower members, and at least one cavity of each mated cavity being smaller than the dimensions of the ball received therewithin, whereby plastic deformation thereof to the configuration of the ball is caused by the ball on interconnection together of the upper and lower members.

---

This invention relates to improvements in plummer blocks and methods of manufacturing the same.

Characteristically, plummer blocks consist of a box-form casting which are split horizontally to take up wear. In the interconnection together of the upper and lower members of the plummer block, it is required that the same be accurately aligned in order to properly receive the bearing brasses. Previous practice has been to drill a hole through the upper member and partly through the lower member, and to insert a pin therein, for holding the upper and lower members in alignment. This has proven unsatisfactory for a variety of reasons, as will be later discussed. The primary object of the present invention is the provision of new and improved aligning means for the upper and lower members of a plummer block.

A further object of the invention is the provision of aligning means embodying a plastic deformation of a portion of at least one of the upper and lower members, insuring proper alignment of the upper and lower members.

A further object is the provision of an improved method of making plummer blocks, including aligning means for the upper and lower members thereof, and which may be mass produced.

Other objects and advantages of the invention will be apparent during the course of the following detailed description, taken in connection with the accompanying drawing, forming a portion of this specification, and in which drawing:

FIG. 1 is a side view of a plummer block in which the upper and lower members thereof are aligned in accordance with previous practices.

FIG. 2 is a fragmentary sectional view taken substantially along the line X—X of FIG. 1.

FIG. 3 is a fragmentary side view showing the left-hand side of a plummer block in which the upper and lower members thereof have been aligned according to the present invention.

FIG. 4 is a fragmentary sectional view taken substantially on the line X'—X' of FIG. 3.

FIGS. 5(a) (b) and (c) are a plurality of fragmentary sectional views showing various embodiments of the invention.

In the drawing, wherein for the purpose of illustration are shown preferred and modified embodiments of the invention, and wherein similar reference characters designate corresponding parts throughout the several views:

The commercial plummer block shown in FIGURES 1 and 2 includes an upper member 1 and a lower member 2 which are interconnected together along their abutting joint faces 3. In accordance with previous methods of aligning upper member 1 with lower member 2, a hole 4 has been drilled from the top of upper member 1, through the abutting joint faces 3 of upper and lower members 1 and 2, and into lower member 2. A knock pin 5 is then inserted within hole 4, the upper portion of hole 4 is filled such as by plug 6, and bolts are attached through screw holes 7 to interconnect upper member 1 and lower member 2 securely together to form a unitary housing providing a bearing receiving opening 8.

As is well understood, plummer blocks undergo quite a good deal of stress in the support of rotating shafts, and it is imperative that the upper and lower members thereof be accurately aligned in order to properly support a bearing. It has been found impossible to keep the upper and lower members in accurate position by merely bolting the two members together with a bolt through screw hole 7. This is the reason why knock pins 5 have been employed. However, in drilling holes 4 which receive knock pins 5, it is extremely difficult to bore a hole that will snugly receive knock pin 5. If hole 4 is too small, knock pin 5 cannot be inserted therewithin, and if it is of too large a diameter, knock pin 5 will be received loosely therewithin, permitting movement of upper member 1 with respect to lower member 2, or vice versa. It has also been found difficult to maintain upper member 1 in alignment with lower member 2 while hole 4 is being drilled. A further drawback has been the necessity of applying a plug 6 to the upper portion of hole 4, after pin 5 has been inserted therewithin. However, it has been found necessary to employ such a plug, for if it is left off, knock pin 5 is likely to become loose within hole 4, dust and dirt may collect within hole 4, and knock pin 5 is likely to rust, causing the same to become brittle and break.

As shown in FIGS. 3–5, the plummer block thereof also includes an upper member 11 and lower member 12 which have abutting joint faces along the line X'—X', and are interconnected together to form a unitary housing having a bearing receiving opening A. As shown in FIG. 4, B is a profile of the joint face of lower member 12. A screw bore 13 is provided through both upper member 11 and lower member 12, for interconnecting the same together.

In my improved aligning means for plummer blocks, referring to the form as shown in FIGS. 3, 4 and 5(a), a cavity 14 is drilled in joint face B of lower member 12. Cavity 14 is of a diameter to freely receive a ball 16, which ball 16 may be of steel or some other material which is harder than the material of which upper member 11 and lower member 12 are made. An adhesive material may be applied at the bottom of cavity 14 for securing ball 16 therewithin.

In the preferred method of manufacture, after ball 16 has been placed within cavity 14, upper member 11 is aligned with lower member 12, the joint faces thereof positioned for abutment with each other, and the two members are pressed together, such as by fastening screws or a hydraulic press. Inasmuch as ball 16 is of a harder material than upper member 11, pressure of the joint face of upper member 11 thereagainst will cause an indentation to be made in the joint face thereof. This mark corresponds to a punch hole, providing a setting for a drill whereby cylindrical cavity 15 may be drilled in upper member 11. Cylindrical cavities 14 and 15 thereby provide a mated cavity receiving ball 16 in such a manner as to insure proper alignment of upper member 11 with lower member 12.

Cylindrical cavity 15 is preferably of sufficient depth to receive ball 16 therewithin but has a diameter which is less than the diameter of ball 16. In interconnection of upper member 11 and lower member 12 together, ball 16 being of a larger diameter than cylindrical cavity 15, will cause a plastic deformation of upper member 11 in the area about cylindrical cavity 15, causing the same to conform to the configuration of ball 16, and securing alignment of upper member 11 with lower member 12. The accuracy of alignment remains even upon substantially detachment and reattachment of the upper and lower members together.

In FIGS. 3 and 4, only a mated cavity in the left-hand side of the plummer block has been shown. The opposite side of the plummer block will also be provided with a mated cavity. Of course, additional mated cavities may be provided at other places along the joint faces of the respective members, if desired.

In the modification as shown in FIG. 5(b), cavity 17 is bored in lower member 12, which cavity may be the same as cavity 14 of the form as shown in FIG. 5(a). In the forming of cavity 19, the upper member 11 is provided with indentation as previously described, and a shallow drill hole is made at such indentation. The upper and lower members are than aligned and pressed together such as by a hydraulic press, which deforms the shallow hole to a configuration which matches the configuration of ball 16.

In the form shown in FIG. 5(c), a semispherical cavity 18 is bored in lower member 12, the same being of a dimension to freely receive ball 16 therewithin, and cavity 20 is formed in upper member 11 in the same manner as previously described in connection with the formation of cavity 19.

It is, of course, obvious that the respective cavities above described may be formed in either upper member 11 or lower member 12, and that the invention is not limited to the positioning of the cavities as above described.

Various changes may be made to the forms of invention herein shown and described without departing from the spirit of the invention or the scope of the following claims.

What is claimed is:

1. A plummer block including upper and lower members having joint faces, connector means for interconnecting said upper and lower members together with the joint faces thereof in abutment in providing a unitary housing, said upper member including a plurality of spaced cavities along the joint face thereof, said lower member including a plurality of spaced cavities along the joint face thereof which are positioned to mate with said cavities of said upper member in defining a plurality of spaced mated cavities, a substantially spherical ball of material harder than said upper and lower members mounted within each said mated cavities, at least one cavity of each said mated cavities having a substantially carcular mouth, which mouth is initially less in diameter than the diameter of said ball, and a tapered bottom face extending across each of said one cavity whereby, when said ball is initially inserted partly within said mouth and out of contact with said bottom wall and said joint faces are in abutment, said ball will contact said bottom wall and cause plastic deformation of such smaller cavity to the configuration of said ball.

2. A plummer block as specified in claim 1 wherein each said one said cavities has a beveled face extending from said mouth to the bottom thereof, said beveled face having substantially circular mouth and beveled bottoms a depth sufficient to receive said ball and is of a restricted diameter which is less than the diameter of said ball.

3. The method of manufacturing a plummer block including upper and lower members having joint faces and in which a connector interconnects the upper and lower members together with the joint faces thereof in abutment in providing a unitary housing the steps which include providing a plurality of spaced cavities, having beveled bottoms, said cavities being along the joint face of the upper member and being free of said beveled bottom, providing a plurality of spaced cavities along the joint face of the lower member which are positioned to mate with the cavities of the upper member in defining a plurality of spaced mated cavities, mounting a ball of material harder than the upper and lower members within each mated cavity, at least one cavity of each said mated cavities being smaller than the dimensions of the ball mounted therein, and forcing said upper and lower members together in face-to-face contact and said ball into said the smaller cavities and against said beveled wall to cause plastic deformation of the smaller cavity to the configuration of the ball by interconnection together of the upper and lower members.

References Cited

UNITED STATES PATENTS

| | | | |
|---|---|---|---|
| 1,982,932 | 12/1934 | Scribner | 308—213 X |
| 2,560,413 | 7/1951 | Carlson | 308—74 |
| 2,609,710 | 9/1952 | Osborn | 308—74 X |
| 2,836,470 | 5/1958 | Sheppard | 308—74 |
| 3,115,356 | 12/1963 | Hohwart | 308—74 X |
| 3,208,804 | 9/1965 | Stenert | 308—212 X |

MARTIN P. SCHWADRON, Primary Examiner

LUCIOUS L. JOHNSON, Assistant Examiner

U.S. Cl. X.R.

287—127

UNITED STATES PATENT OFFICE
CERTIFICATE OF CORRECTION

Patent No. 3,484,142                          December 16, 1969

Noboru Nishiwaki

It is certified that error appears in the above identified patent and that said Letters Patent are hereby corrected as shown below:

In the heading to the printed specification, lines 4 to 6, "assignor to the United States of America as represented by the Secretary of the Air Force" should read -- assignor to The Toyo Bearing Manufacturing Company, Limited, Osaka, Japan, a corporation of Japan --. Column 3, line 11, "substantially" should read -- subsequent --. Column 4, line 4, "carcular" should read -- circular --.

Signed and sealed this 16th day of June 1970.

(SEAL)
Attest:

Edward M. Fletcher, Jr.                   WILLIAM E. SCHUYLER, JR.
Attesting Officer                           Commissioner of Patents